(12) United States Patent
Tokiwa et al.

(10) Patent No.: US 7,599,617 B2
(45) Date of Patent: Oct. 6, 2009

(54) CAMERA LENS MOUNT APPARATUS

(75) Inventors: Kentaro Tokiwa, Saitama (JP); Takashi Machida, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 453 days.

(21) Appl. No.: 11/540,609

(22) Filed: Oct. 2, 2006

(65) Prior Publication Data

US 2007/0077063 A1    Apr. 5, 2007

(30) Foreign Application Priority Data

Sep. 30, 2005    (JP) .............................. 2005-288394

(51) Int. Cl.
*G03B 17/00*    (2006.01)
(52) U.S. Cl. ...................... 396/532; 396/529; 396/531; 439/284; 439/286; 439/545; 439/546
(58) Field of Classification Search ................. 396/529, 396/531, 532; 439/284, 286, 545, 546
See application file for complete search history.

(56) References Cited

U.S. PATENT DOCUMENTS

| 4,464,034 | A | * | 8/1984 | Tomino | ....................... 396/303 |
|---|---|---|---|---|---|
| 4,637,704 | A | * | 1/1987 | Ishimura et al. | ............. 396/301 |
| 4,739,356 | A | * | 4/1988 | Ogura et al. | ................. 396/532 |
| 4,853,725 | A | * | 8/1989 | Matsuda et al. | ............. 396/529 |
| 5,079,578 | A | * | 1/1992 | Kohno et al. | ............. 348/223.1 |
| 5,359,379 | A | * | 10/1994 | Kohno et al. | ................... 396/80 |
| 2007/0065129 | A1 | * | 3/2007 | Shiratori | ...................... 396/55 |
| 2007/0292127 | A1 | * | 12/2007 | Kuhmann et al. | ........... 396/529 |

FOREIGN PATENT DOCUMENTS

| JP | 58-83824 A | 5/1983 |
|---|---|---|
| JP | 2-163728 A | 6/1990 |
| JP | 2000-175089 A | 6/2000 |

* cited by examiner

*Primary Examiner*—W B Perkey
*Assistant Examiner*—Warren K Fenwick
(74) *Attorney, Agent, or Firm*—Sughrue Mion, PLLC

(57) ABSTRACT

A camera comprises a lens unit and a camera body to which the lens unit is attached by a rotational operation. The camera body is provided with terminals including a specific terminal. Arrangement of the specific terminal is different from that of the other terminals. In detaching the lens unit from the camera body, the specific terminal is adapted to be disconnected earlier relative to the other terminals while the other terminals are connected. After the disconnection of the specific terminal has been detected, the other terminals are set to high impedance.

23 Claims, 12 Drawing Sheets

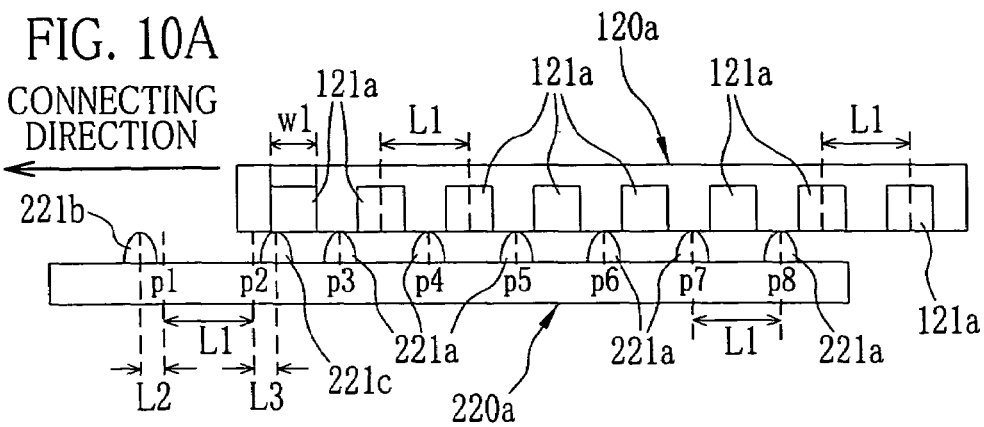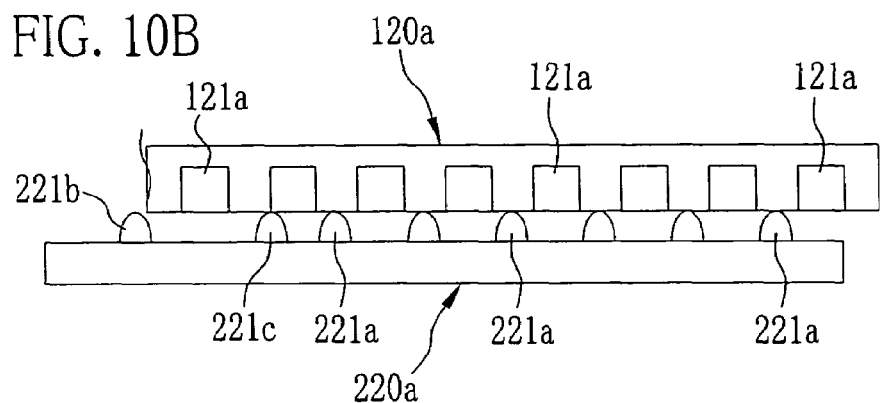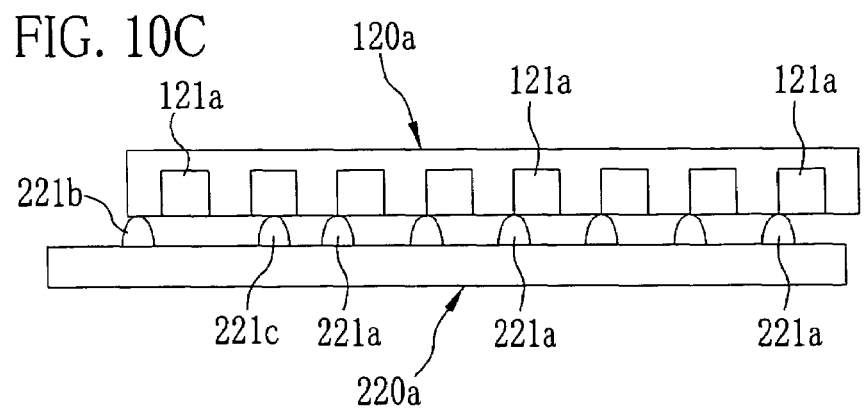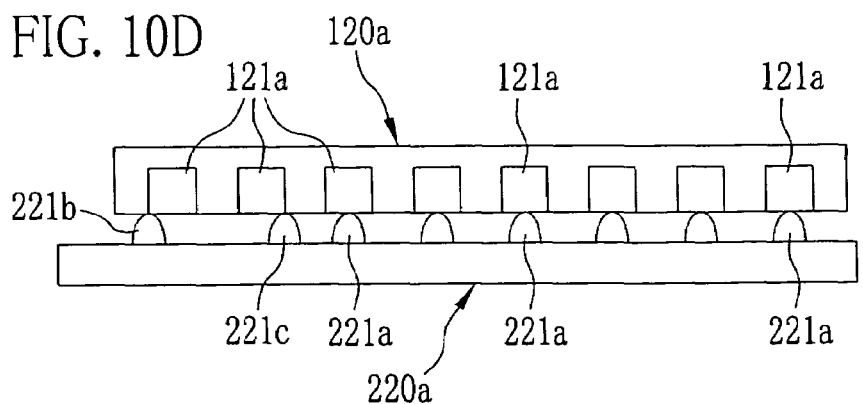

CONNECTING DIRECTION ←

CAMERA LENS MOUNT APPARATUS

FIELD OF THE INVENTION

The present invention relates to an electronics device system in which electronics devices of a lens unit and a camera body composing an interchangeable lens camera, for example, are safely detached from each other, and the present invention further relates to the electronics device.

BACKGROUND OF THE INVENTION

Conventionally, in a general camera with interchangeable lenses, it is necessary to connect a lens unit and a camera body not only optically but also electrically in order to perform communication and electric supply between them. For this reason, mount portions of the lens unit and the camera body are provided with terminals. The mount portion is restricted regarding its size to some extent. Thus, various problems are caused in disposing the terminal on the mount portion. For the purpose of solving these problems, many inventions concerning the disposition of the terminal have been made.

For example, there is a technique (see Japanese Patent Laid-Open Publication No. 02-163728) in that terminals of a camera-body side are disposed around an optical axis and at least two electric-supply terminals having different height are provided in a contact direction so as to form a step in this direction. At a position perpendicular to the contact direction of the camera-body-side terminal, a protrusion projecting from the connect terminal in the contact direction is formed. Moreover, a cutout is formed at a position which opposes to the protrusion at a time when both mounts are joined and separated.

In this technique, the mount portion of the camera-body side is provided with the electric-supply terminals disposed at the stepwise positions. Thus, at a time of detaching the lens unit, the electric-supply terminal is prevented from coming into contact with the other terminal and electrically shorting therewith. Since this technique concerns the terminals having different height, it is impossible to adopt this technique to an uneven shape.

Meanwhile, there is an interchangeable lens in which an interval of the electric-supply terminals is set so as to be different from that of the other terminal (see Japanese Patent Laid-Open Publication No. 58-83824, for instance). The respective terminals of the mount portion of the lens-unit side are biased by a biasing member so as to be connected to the respective terminals of the camera-body side. At the same time, the terminals of the lens-unit side are disposed on an identical circle located in a plane perpendicular to an optical axis of a lens, and the terminals are adapted to slide at a time of a rotational operation.

In this technique, the disposition distances of the terminals are different from each other so as not to contact a power source and the ground with a signal line at a detaching time of a lens unit for the purpose of preventing electrical short circuit.

In the meantime, a camera comprising a lens unit and a camera body is known (see Japanese Patent Laid-Open Publication No. 2000-175089, for instance). The lens unit includes a shooting optical system and an image sensor. The camera body to which the lens unit is detachably attached receives an image signal from the lens unit and performs signal processing.

Regarding the camera such as described in the above-noted Publication No. 2000-175089, the lens unit is likely to be detached from the camera body while a taken image is recorded. If the lens unit is detached from the camera body, a protective function does not work and not only the currently recorded image information but also all image information stored in a recording medium are likely to be destroyed. If the lens unit is accidentally or purposely detached from the camera body during the recording, the terminals disposed on both of the lens unit and the camera body are suddenly disconnected. Due to this, a surge voltage having a large momentary peak value is applied to both internal circuits from the terminal side. This is the reason why the image information is destroyed. However, there is no description concerning this problem in all of the above-noted Publications.

SUMMARY OF THE INVENTION

In view of the foregoing, it is a primary object of the present invention to provide an electronics device system comprising terminals disposed so as to safely perform a shutdown operation upon detecting detachment of a first electronics device, which is almost detached from a second electronics device while recording is performed in the second electronics device.

It is a second object of the present invention to provide the electronics device of the above-mentioned electronics device system.

It is a third object of the present invention to provide an interchangeable lens camera comprising terminals disposed so as to safely perform a shutdown operation upon detecting detachment of a lens unit, which is almost detached from a camera body while recording is performed in the camera body.

In order to achieve the above and other objects, the electronics device system according to the present invention comprises a first electronics device including a first terminal group in which terminals are aligned, and a second electronics device including a second terminal group in which terminals are aligned so as to correspond to the terminals of the first terminal group. The first electronics device is attached to the second electronics device by a rotational operation. In association with the attachment operation of the first and second devices, the first terminal group slides on the second terminal group from one end thereof in the alignment direction of the terminals. When the first and second electronics devices are completely attached, the terminals of the first terminal group are connected to the terminals of the second terminal group one on one to form plural terminal pairs including first and second terminal pairs. When the attachment operation of the first and second electronics devices is performed, the second terminal pair is connected after the first terminal pair has been connected. When a detachment operation of the first and second electronics devices is performed, the second terminal pair is disconnected before the first terminal pair is disconnected.

In a preferred embodiment, a first terminal interval is different from a second terminal interval. In this regard, the first terminal interval is an interval of two terminals included in the first terminal group and forming the first and second terminal pairs, and the second terminal interval is an interval of two terminals included in the second terminal group and forming the first and second terminal pairs. In another embodiment, the terminal forming the second terminal pair has a different width from the other terminals in either one of the first and second terminal groups. It is preferable to dispose the second terminal pair at an outermost portion of the first and second terminal groups. It is also preferable that the first terminal pair is set to high impedance after disconnection of the second terminal pair while the first terminal pair is connected.

The terminal pairs may include a third terminal pair. When the attachment operation of the first and second electronics devices is performed, the third terminal pair is connected after the first and second terminal pairs have been connected. When the detachment operation of the first and second electronics devices is performed, the third terminal pair is disconnected before the first and second terminal pairs are disconnected.

To the electronics device according to the present invention, an accessory is attached by a rotational operation. The accessory includes a first terminal group in which terminals are aligned, and the electronics device includes a second terminal group in which terminals are aligned so as to correspond to the terminals of the first terminal group. In association with the attachment operation of the accessory and the electronics device, the first terminal group slides on the second terminal group from one end thereof in the alignment direction of the terminals. When the accessory is completely attached to the electronics device, the terminals of the first terminal group are connected to the terminals of the second terminal group one on one to form plural terminal pairs including first and second terminal pairs. When the attachment operation of the accessory and the electronics device is performed, the second terminal pair is connected after the first terminal pair has been connected. When a detachment operation of the accessory and the electronics device is performed, the second terminal pair is disconnected before the first terminal pair is disconnected.

The terminal pairs may include a third terminal pair. When the attachment operation of the accessory and the electronics device is performed, the third terminal pair is connected after the first and second terminal pairs have been connected. When the detachment operation of the accessory and the electronics device is performed, the third terminal pair is disconnected before the first and second terminal pairs are disconnected.

It is preferable that the electronics device is a camera body and the accessory is a lens unit including a taking lens and an image sensor.

According to the present invention, even if the first electronics device is detached from the second electronics device while recording of image information is performed in the second electronics device, it is possible to prevent the image information from being destroyed.

BRIEF DESCRIPTION OF THE DRAWINGS

FIGS. 10A, 10B, 10c and 10D are schematic section views of terminal arrangement of a second embodiment;

DESCRIPTION OF THE PREFERRED EMBODIMENTS

FIGS. 1 through 4 are perspective views of a camera 100 according to a first embodiment of the present invention.

Figure 1:
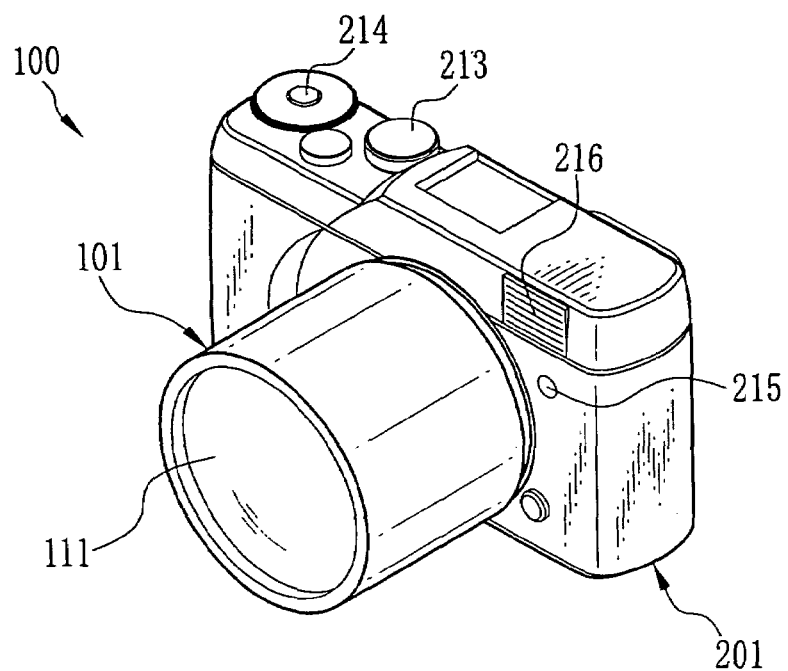
FIG. 1 is a perspective view of a camera according to a first embodiment of the present invention.

The camera 100 shown in FIG. 1 is an electronic camera comprising a lens unit 101 and a camera body 201 to which the lens unit 101 is detachably attached. The lens unit 101 includes a shooting optical system 111. The camera body 201 receives image information from the lens unit 101. The lens unit 101 and the camera body 201 are coupled by means of bayonet connection.

Figure 2:
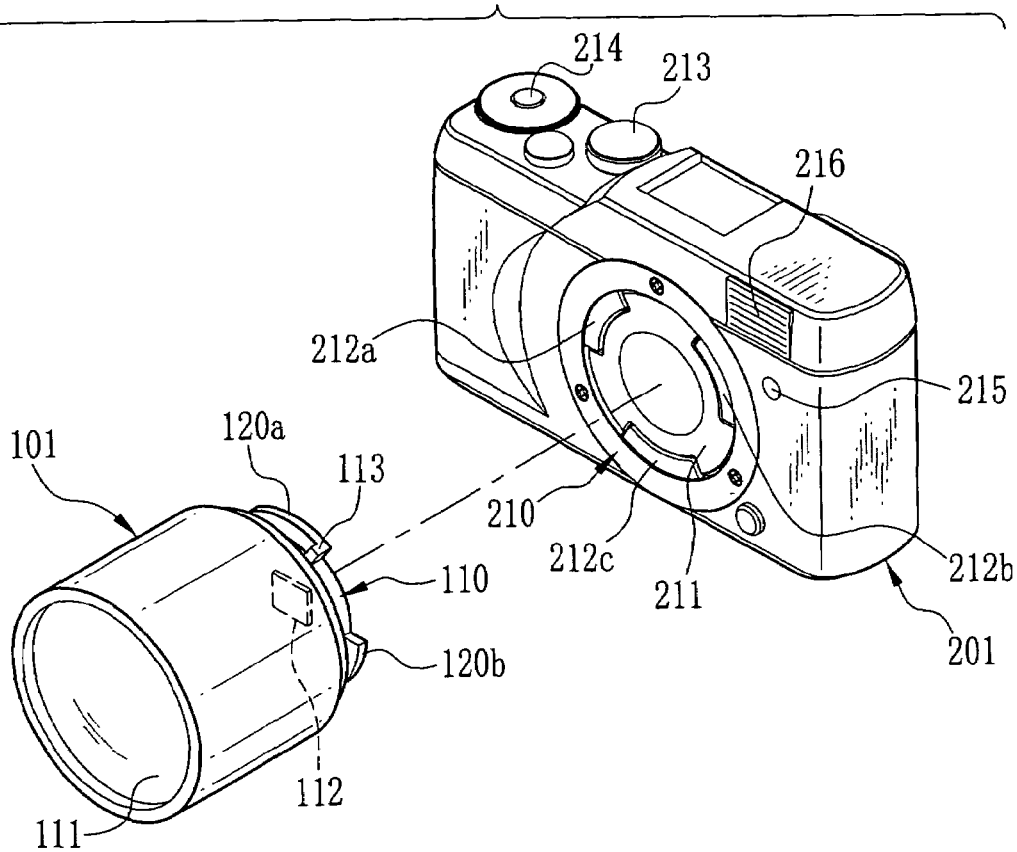
FIG. 2 is an exploded perspective view of the camera shown in FIG. 1.

FIG. 2 shows a state in that the lens unit 101 is not yet attached to the camera body 201.

Figure 3:
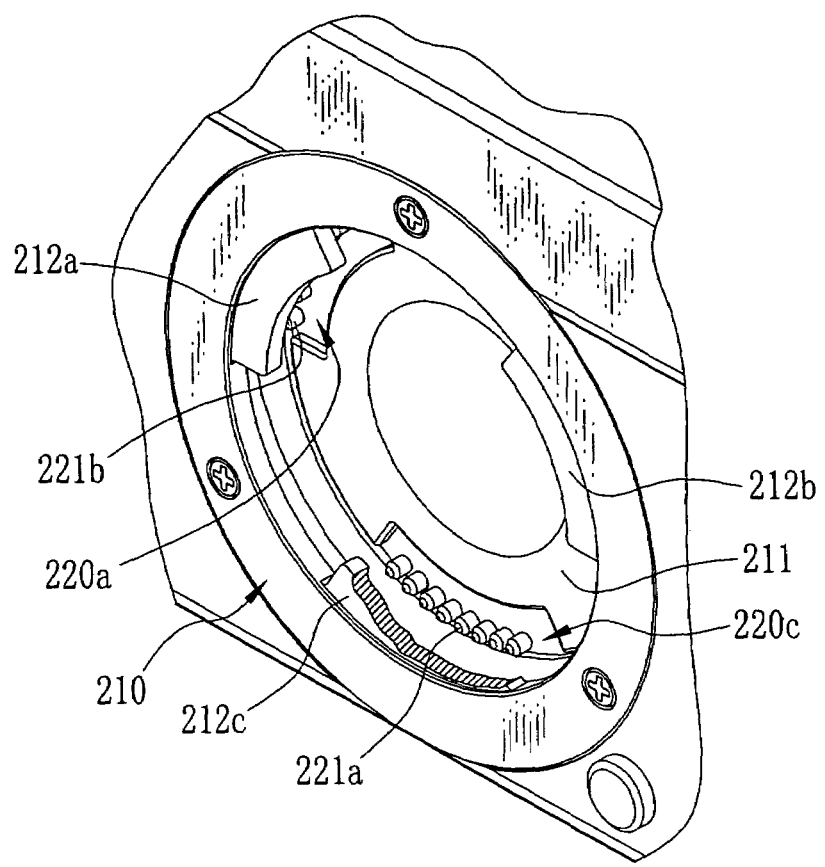
FIG. 3 is a perspective view of a mount portion of a camera-body side shown in FIG. 2, wherein a mount barrier is pushed inside the camera body.

FIG. 3 shows a mount portion 210 of a body side. The mount portion 210 shown in FIG. 3 is kept in a state that a mount barrier 211 is pushed inside the camera body 201. The mount barrier 211 is biased by a spring or the like from the inside of the camera body 201 toward a front surface thereof.

As shown in FIG. 2, the center front of the camera body 201 is provided with the body-side mount portion 210 including the mount barrier 211 and three bayonet claws 212a, 212b and 212c of the body side. Further, a rear side of the lens unit 101 in an optical-axis direction is provided with a mount portion 110 of a lens side, which has a similar shape with the mount barrier 211. The lens unit 101 contains an image sensor 112. Since a CCD solid-state image sensor is used in this embodiment, the image sensor 112 is referred to as CCD hereinafter. The lens-side mount portion 110 comprises three bayonet claws 120a, 120b and 120c.

The mount barrier 211 is biased by the spring or the like from the inside of the camera body 201 toward the front surface thereof. When the lens unit 101 is fitted to the body-side mount portion 210, the mount barrier 211 pressed by the lens-side mount portion 110 is pushed inside the camera body 201. As shown in FIG. 3, behind the body-side mount portions 212a, 212b and 212c, there are bayonet-claw receivers 220a, 220b and 220c (described later with reference to FIG. 6) wherein many terminals are disposed so as to protrude toward the front in the optical axis direction. Upon rotating the lens unit 101 after pushing the mount barrier 211 with the lens unit 101, terminals disposed at the bayonet claws 120a, 120b and 120c slide on the terminals disposed at the bayonet-claw receivers 220a, 220b and 220c. And then, the terminals are connected one on one. The lens unit 101 is physically and securely fixed to the camera body 201 and is electrically connected thereto.

When an operation for detaching the lens unit 101 from the camera body 201 is performed, the lens unit is adapted to be detached from one position located around the optical axis. In this regard, the three bayonet claws 120a, 120b and 120c respectively have a different shape. For example, at least one bayonet claw is larger than the other bayonet claw. When the shapes of the bayonet claws 120a, 120b and 120c are identical, these bayonet claws circularly disposed have irregular intervals. The mount barrier 211 is formed in accordance with the shapes and the arrangement of the bayonet claws 120a, 120b and 120c. In this way, the lens unit is adapted to be detachable from the sole position.

At least one of the bayonet claws 120a, 120b and 120c is provided with a rotational regulator 113. For example, the bayonet claw 120a is provided with the rotational regulator 113 such as shown in FIG. 2. A rotative direction for attaching the lens unit 101 to the camera body 201 is determined in one direction on the basis of a relationship between the rotational regulator 113 and the body-side bayonet claw 212b. In addition, when the lens unit 101 is rotated by a certain angle, the rotational regulator 113 abuts on the body-side bayonet claw 212a. Thus, the bayonet claws 120a, 120b and 120c always engage with the bayonet-claw receivers 220a, 220b and 220c in a correct combination.

As to the camera 100, the camera body 201 is equipped with a battery (not shown) from which an electric power is supplied to the camera body 201. At the same time, the electric power is also supplied to the lens unit 101 through electric-supply terminals included in the many terminals of both of the lens unit 101 and the camera body 201. When the electric power of the battery contained in the camera body 201 is supplied to the lens unit 101 through the electric-supply terminals, both of the lens unit 101 and the camera body 201 are set to an actuation state.

Incidentally, the lens unit 101 may be equipped with the battery. In this case, the electric power is supplied from the lens unit 101 to the camera body 201 through the electric-supply terminals included in the many terminals of both of the lens unit 101 and the camera body 201. Each of the lens unit 101 and the camera body 201 may be equipped with the battery. In this case, when one of the batteries falls below a threshold level or reaches zero, the electric power is supplied from the other battery through the electric-supply terminals.

As shown in FIGS. 1 and 2, a top surface of the camera body 201 is provided with a release button 213 and a mode dial 214. When a shooting mode is selected by the mode dial 214, shooting is performed upon depression of the release button 213 and the image information is sent from the lens unit 101 to the camera body 201. As to items of the mode dial 214, there are a reproduction mode, a power switch and so forth besides the shooting mode. By rotating the mode dial 214, one of the items is selected. Meanwhile, the front of the camera body 201 is provided with an AWB sensor 215, a flash window 216 and so forth.

Figure 4:
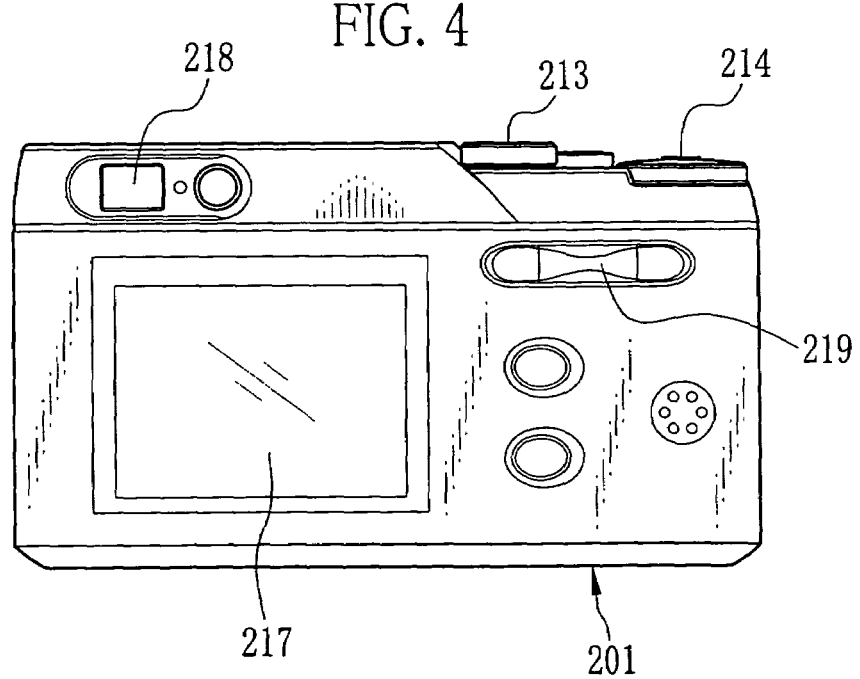
FIG. 4 is a rear view of the camera shown in FIG. 1.

As shown in FIG. 4, the rear of the camera body 201 is provided with an LCD 217, a viewfinder 218, a selection button 219 and so forth. For example, a through image is displayed on the LCD 217 under the shooting mode, and a taken still image and a taken moving image are displayed thereon under the reproduction mode. A role of the selection button 219 changes in accordance with the various modes. Under the shooting mode, for instance, the selection button 219 works to select a wide-angle zoom function and a telephoto zoom function. Under the reproduction mode, for instance, the selection button 219 works to select a thumbnail displayed on the LCD 217.

Next, arrangement of the terminals according to the first embodiment of the present invention is described below with reference to FIGS. 5 and 6.

Figure 5:
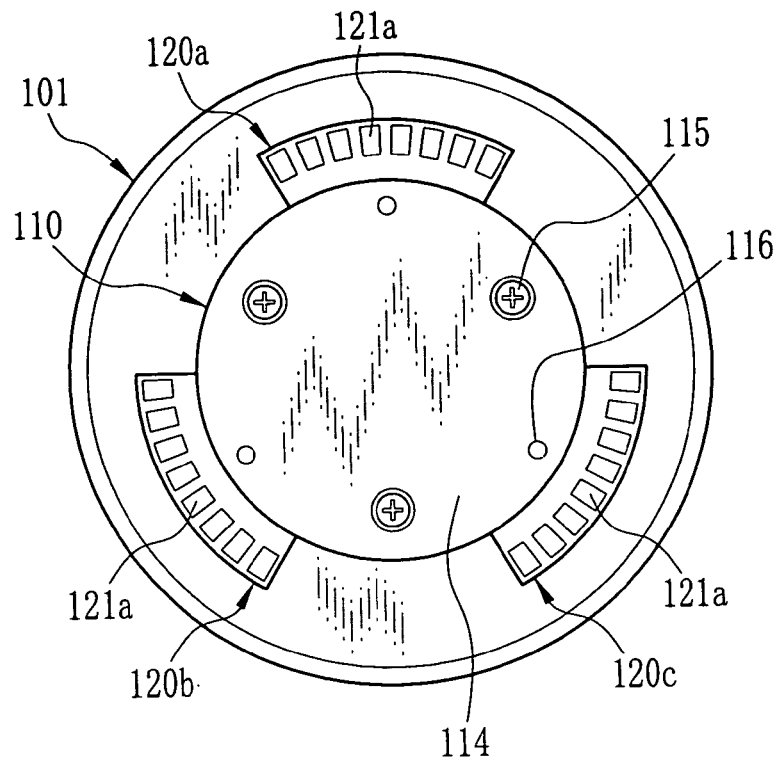
FIG. 5 is a plan view of a mount portion of a lens side.

FIG. 5 is a plan view of the lens-side mount portion 110 including the bayonet claws 120a, 120b and 120c disposed around a circular member to which a circular conductive member 114 is fixed by screws 115. The circular conductive member 114 is provided with conductive projections 116. When the lens unit 101 is attached to the camera body 201, the projection 116 comes into contact with the mount barrier 211 of the camera body 201 to form a ground line extending from the inside of the lens unit 101 to the camera body 201.

The terminals 121a are disposed on each of the bayonet claws 120a, 120b and 120c by eight, namely by twenty four in total. The terminals 121a are disposed in an arc shape so as to correspond to a shape of the bayonet claws 120a, 120b and 12c.

Figure 6:
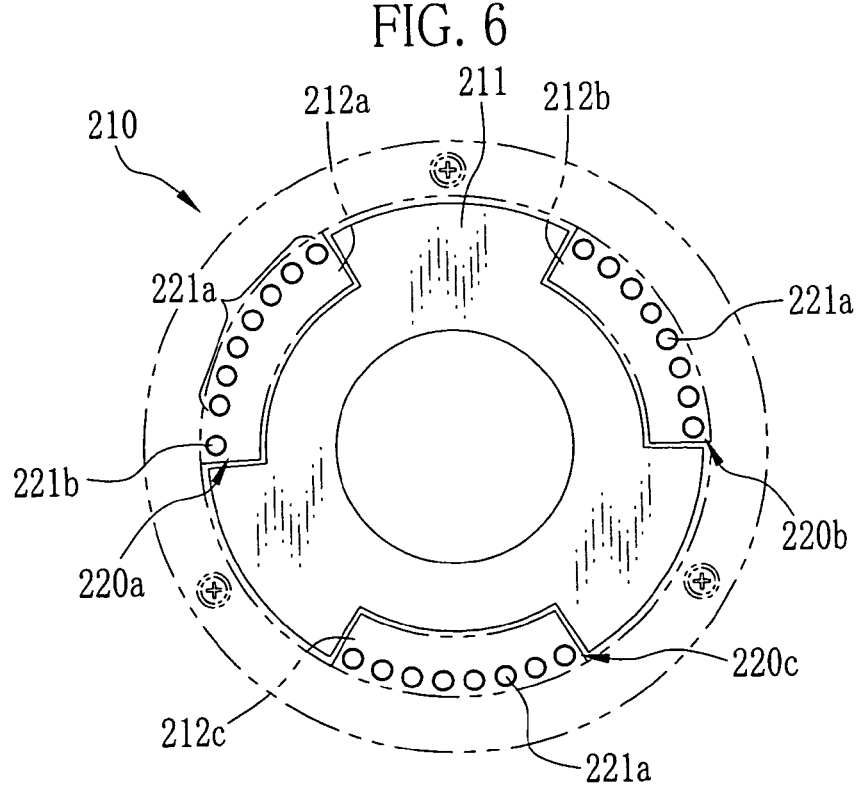
FIG. 6 is a plan view of the mount portion of the camera-body side.

FIG. 6 is a plan view of the body-side mount portion 210 comprising the mount barrier 211, which is disposed at the center and has a similar shape with the lens-side mount portion 110. The body-side bayonet claws 212a, 212b and 212c (shown by a broken line) are disposed along the shape of the mount barrier 211. Behind the body-side bayonet claws 212a, 212b and 212c, are provided the bayonet-claw receivers 220a, 220b and 220c on which many terminals are disposed. On each of the bayonet-claw receivers 220b and 220c, the terminals 221a are disposed at regular intervals by eight. On the bayonet-claw receiver 220a, the terminals 221a are disposed at regular intervals by seven and the terminal 221b is disposed at a different interval. The terminals 221a and the terminal 221b are disposed in an arc shape so as to correspond to the arrangement of the terminals 121a disposed on the opposing bayonet claws 120a, 120b and 120c.

In the above description, the terminals 121a are disposed on the surfaces of the bayonet claws 120a, 120b and 120c confronting the camera body, and the terminals 221a and 221b are disposed on the bayonet-claw receivers 220a, 220b and 220c. However, the arrangement of the terminals of the present invention is not limited to these positions. For example, the terminals 121a may be disposed on the front surfaces of the bayonet claws 120a, 120b and 120c in the optical-axis direction, and the terminals 221a and 221b may be disposed on the rear surfaces of the body-side bayonet claws 212a, 212b and 212c in the optical-axis direction.

As to the terminals disposed on the bayonet claws and the bayonet-claw receivers, effect and other embodiments are described later with reference to FIGS. 8 to 17.

Figure 7:
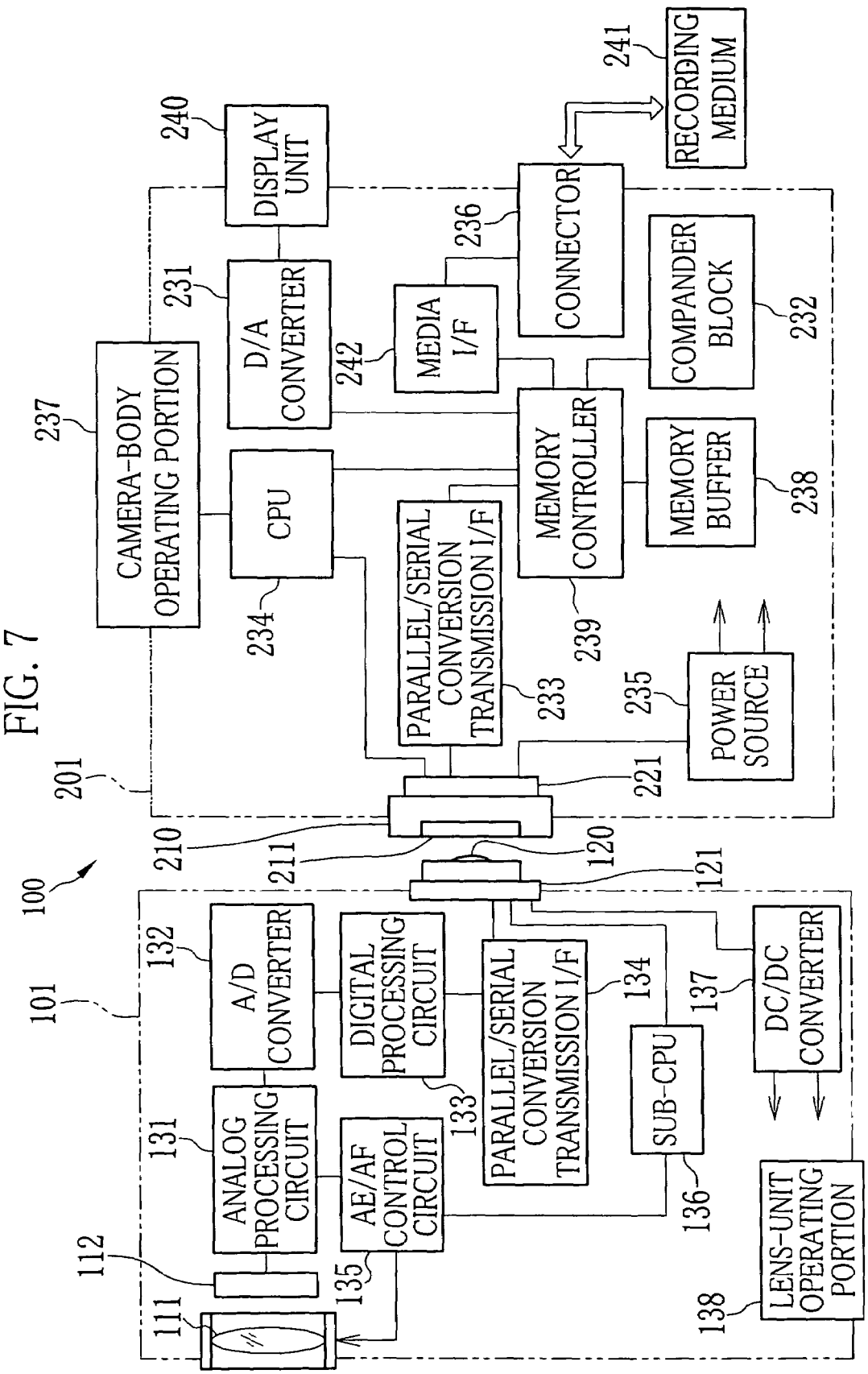
FIG. 7 is a block diagram of the camera according to the first embodiment of the present invention.

FIG. 7 is a block diagram showing the camera 100 common to the respective embodiments of the present invention.

As shown in FIG. 7, the camera 100 is the electronics camera including the lens unit 101 and the camera body 201. The lens unit 101 comprises the shooting optical system 111 and the CCD 112. The camera body 201 comprises the concave mount portion 210 to which the lens unit 101 is detachably attached. The camera body 201 performs communication with the lens unit 101 attached to the body-side mount portion 210. The camera body 201 receives an image signal from the lens unit 101 and performs signal processing therefor.

The lens unit 101 comprises a terminal group 121, a lens-unit operating portion 138, an AE/AF control circuit 135, a sub-CPU (Central Processing Unit) 136, and a DC/DC converter 137. The lens-unit operating portion 138 receives operational instructions from a camera operator. The AE/AF control circuit 135 performs automatic exposure control and automatic focus control. The sub-CPU 136 controls an operation of each section of the lens unit 101. The DC/DC converter 137 converts a DC voltage, which has been received from the camera body 201 via the terminal group 121, into a required DC voltage to be supplied to each section of the lens unit 101.

The CCD 112 outputs a signal of an image taken by the shooting optical system 111. For the image signal outputted from the CCD 112, an analog processing circuit 131 performs processing of gain adjustment, noise reduction and so forth. After that, an A/D (Analog/Digital) converter 132 converts the image signal into a digital signal. For the digital signal, a subsequent digital processing circuit 133 performs white-balance correction and gamma correction to produce a normal YC signal, which is independent of the CCD 112. The normal YC signal is converted into a serial signal by a parallel/serial conversion transmission interface 134. After that, the serial signal is sent to the camera body 201 via the terminal group 121 and a terminal group 221.

Besides the terminal group 221, the body-side mount portion 210 and the mount barrier 211, the camera body 201 comprises a camera-body operating portion 237, a CPU 234, a compander block 232, a memory buffer 238, a memory controller 239, a parallel/serial conversion transmission interface 233, a D/A converter 231, a display unit 240, a media interface 242, and a power source 235. The camera-body operating portion 237 receives operational instructions from the camera operator. The CPU 234 controls the whole of the camera body 201. The compander block 232 compresses and expands the normal YC signal sent from the lens unit 101. The memory buffer 238 temporarily stores the YC signal, compressed data and so forth. The memory controller 239 controls the memory buffer 238. The parallel/serial conversion transmission interface 233 performs parallel/serial conversion processing for the signal received from the lens unit 101 and for the signal to be sent thereto. The D/A converter 231 converts the digital signal stored in the memory buffer 238, into the analog signal. The display unit 240 comprises an LCD (Liquid Crystal Display), for example, to display the image information converted into the analog signal by the D/A converter 231. The media interface 242 records the compressed image information in an external recording medium 241 of a memory card and so forth. The power source 235 supplies necessary power to a connector 236 and each section of the camera body 201. In addition, the power source 235 supplies necessary power to the lens unit 101 via the terminal group 221.

Incidentally, FIG. 7 shows one embodiment of the present invention, and this embodiment is not exclusive. For example, the electronic camera may be variously composed in accordance with variation of a taking lens, a pixel number of the CCD, moving-image shooting, still-image shooting, a shooting aid mechanism of camera-shake correction and so on, CCDs and lenses for stereoscopic-image shooting, and so forth.

Figure 8A:
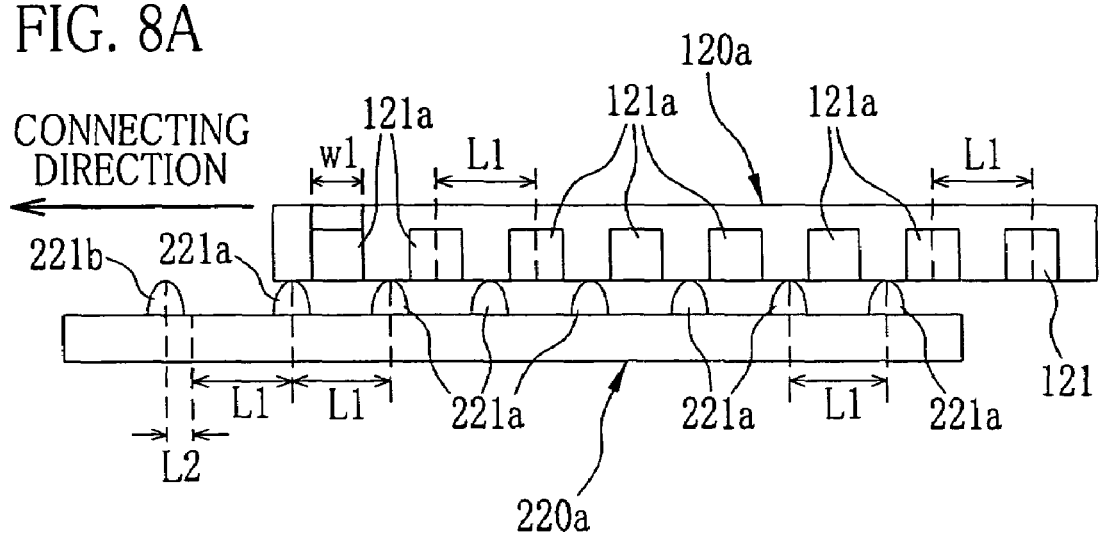
FIGS. 8A, 8B and 8C are schematic section views of terminal arrangement of the first embodiment.
Figure 8B:
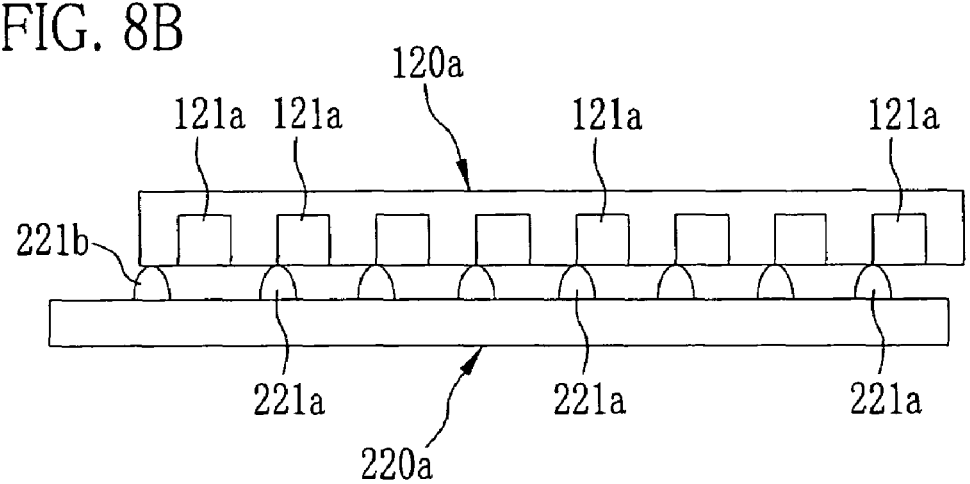
Figure 8C:
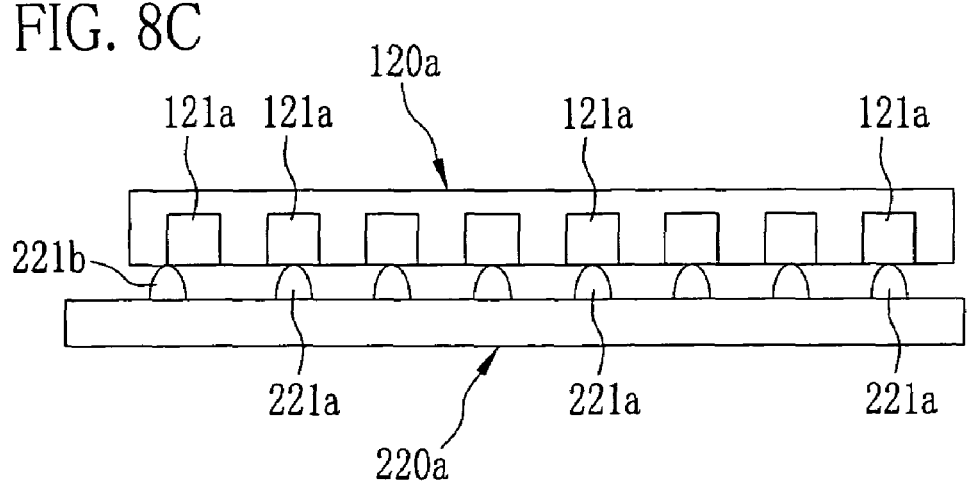

Next, a terminal structure of the first embodiment according to the present invention is described below. FIGS. 8A to 8C show the terminal structure of the first embodiment. FIGS. 8A to 8C are schematic section views taken in a sliding direction of the terminals of the bayonet claw 120a and the bayonet-claw receiver 220a confronting each other. The terminals 121a having a terminal width W1 are disposed on the bayonet claw 120a at regular intervals L1 by eight. The terminals 221a are disposed on the bayonet-claw receiver 220a at regular intervals L1 by seven. The terminal 221b is disposed at a position separated from the adjacent right terminal 221a by a length of "L1+L2". In the first embodiment, relationships of "W1<L1" and "L2<W1/2" are satisfied. In this regard, the terminal width means a breadth extending in the sliding direction of the terminals confronting each other. The center of the terminal width is defined as the terminal center. The interval of the terminals means a distance between the terminal centers.

The bayonet claw 120a and the bayonet-claw receiver 220a are connected by attaching the lens unit 101 to the camera body 201. In connecting the bayonet claw 120a and the bayonet-claw receiver 220a, the bayonet claw 120a moves in the left direction (hereinafter referred to as connecting direction) in FIGS. 8A to 8C. By contrast, in releasing the connection of the bayonet claw 120a and the bayonet-claw receiver 220a, the bayonet claw 120a moves in the right direction (hereinafter referred to as releasing direction) in FIGS. 8A to 8C. The connecting direction and the releasing direction are common until FIG. 17 described later.

FIG. 8A shows the beginning of slide movement wherein the bayonet claw 120a is just about to connect to the bayonet-claw receiver 220a.

In FIG. 8B, the bayonet claw 120a is slid in the connecting direction from the position shown in FIG. 8A and the terminals 221a are connected to the opposing terminals 121a. At this time, the terminal 221b is not yet connected.

In FIG. 8C, the bayonet claw 120a is further slid in the connecting direction from the position shown in FIG. 8B and the terminal 221b is connected to the opposing terminal 121a. In other words, all the terminal pairs are connected in FIG. 8C.

Thus, by detecting the connection of the terminal 221b, it is possible to judge that all the terminal pairs are connected. Consequently, it is unnecessary to provide a special mechanism for detecting the completion of the connection of the terminal pairs. By merely changing the arrangement interval of the terminal such as described above, it is possible to add the judgment function for judging the completion of the connection of all the terminal pairs. This is very advantageous to reduction of a number of parts, reduction of cost, downsizing of the device, and so forth.

Meanwhile, in releasing the connection of the bayonet claw 120a and the bayonet-claw receiver 220a, the bayonet claw 120a is slid relative to the bayonet-claw receiver 220a in order of FIG. 8C, FIG. 8B and FIG. 8A. Thus, the terminal 221b is disconnected while the terminals 221a are connected. By detecting the disconnection of the terminal 221b, it is judged that an operation for detaching the lens unit 101 from the camera body 201 is performed. From the detection of the disconnection of the terminal 221b until the disconnection of the other terminal pairs, it is possible to turn off the power supply of the lens unit after setting the other terminal pairs to high impedance. In virtue of this, even if the operation for detaching the lens unit 101 from the camera body 201 is performed while the image information and so forth are recoded by using the terminal 221a, it is possible to detect the disconnection of the terminal 221b on ahead so that the recording is safely stopped in the above-mentioned way while the terminal 221a is connected to the terminal 121a.

Figure 9:
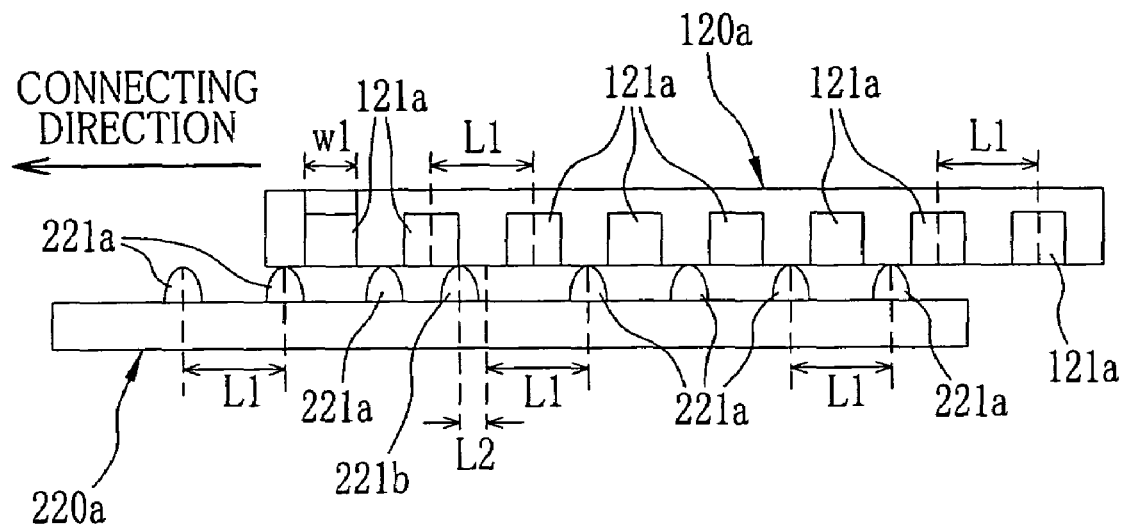
FIG. 9 is a schematic section view of terminal arrangement of the modified first embodiment.

Next, a modified embodiment of the first embodiment is described below with reference to FIG. 9. In this drawing, the terminal 221b is disposed at a position, which is located between the terminals 221a and is separated from the adjacent right terminal 221a by a length of "L1+L2". Except the terminal 221b, conditions of the terminal width, the terminal interval and so forth are identical with the first embodiment.

Also in this modified embodiment, as the bayonet claw 120a is slid in the connecting direction, the terminals 221a are connected first similarly to the first embodiment. After that, the terminal 221b is connected. In releasing the connection of the bayonet claw 120a and the bayonet-claw receiver 220a, the terminal 221b is disconnected while the terminals 221a are connected, similarly to the first embodiment.

As described above, when the terminal 221b is disposed at the position separated from the adjacent right terminal 221a by the length of "L1+L2", effects identical with the first embodiment are obtained regardless of the arrangement order of the terminals 221a and 221b.

Next, a second embodiment of the present invention is described below with reference to FIGS. 10A to 10D showing a terminal structure of this embodiment. FIGS. 10A to 10D are schematic section views taken in the sliding direction of the terminals of the bayonet claw 120a and the bayonet-claw receiver 220a confronting each other. The terminals 121a having a terminal width W1 are disposed on the bayonet claw 120a at regular intervals L1 by eight. When the bayonet claw 120a has been connected to the bayonet-claw receiver 220a, the centers of the respective terminals 121a overlap with points P1 to P8 located on the bayonet-claw receivers 220a. The terminals 221a are disposed at the points P3 to P8, and the terminal 221b is disposed so as to be separated from the point P1 by a length L2 in the connecting direction. The terminal 221c is disposed so as to be separated from the point P2 by a length L3 in the releasing direction. In the second embodiment, relationships of "W1<L1", "L2<W1/2" and "L3<W1/2" are satisfied.

FIG. 10A shows the beginning of slide movement wherein the bayonet claw 120a is just about to connect to the bayonet-claw receiver 220a.

In FIG. 10B, the bayonet claw 120a is slid in the connecting direction from the position shown in FIG. 10A and the terminal 221c is connected to the opposing terminals 121a. At this time, the terminals 221a and 221b are not yet connected.

In FIG. 10C, the bayonet claw 120a is further slid in the connecting direction from the position shown in FIG. 10B and the terminals 221a are connected to the opposing terminals 121a. At this time, the terminal 221b is not yet connected.

In FIG. 10D, the bayonet claw 120a is further slid in the connecting direction from the position shown in FIG. 10C and the terminal 221b is connected to the opposing terminal 121a. In other words, all the terminals are connected in FIG. 10D.

Meanwhile, in releasing the connection of the bayonet claw 120a and the bayonet-claw receiver 220a, the bayonet claw 120a is slid relative to the bayonet-claw receiver 220a in order of FIG. 10D, FIG. 10C, FIG. 10B and FIG. 10A. Thus, the terminal 221b, the terminals 221a and the terminal 221c are disconnected in this order.

In virtue of the terminal 221c, it is possible to make timing of connection and release of the terminals differ in three steps. There are the following effects in addition to the effect identical with the first embodiment.

For example, in a case that the terminal 221c is used as the electric-supply terminal, this terminal is disconnected at last after the disconnection of the other terminals in detaching the lens unit 101 from the camera body 201. Thus, electric connection is stabilized.

In a case that the terminal 221c is used as a terminal for ground (hereinafter referred to as GND terminal), this terminal is connected first in attaching the lens unit 101 to the camera body 201. In this case, failure to be caused by static electricity can be avoided.

Also in the second embodiment, relative arrangement of the respective terminals 221a, 221b and 221c is not limited to FIGS. 10A to 10D. On condition that the terminal 221b is disposed at a position separated from any one of the points P1 to P8 by the length L2 in the connecting direction and the terminal 221c is disposed at a position separated from any one of the points P1 to P8 by the length L3 in the releasing direction, effects identical with the second embodiment can be obtained.

Figure 11:
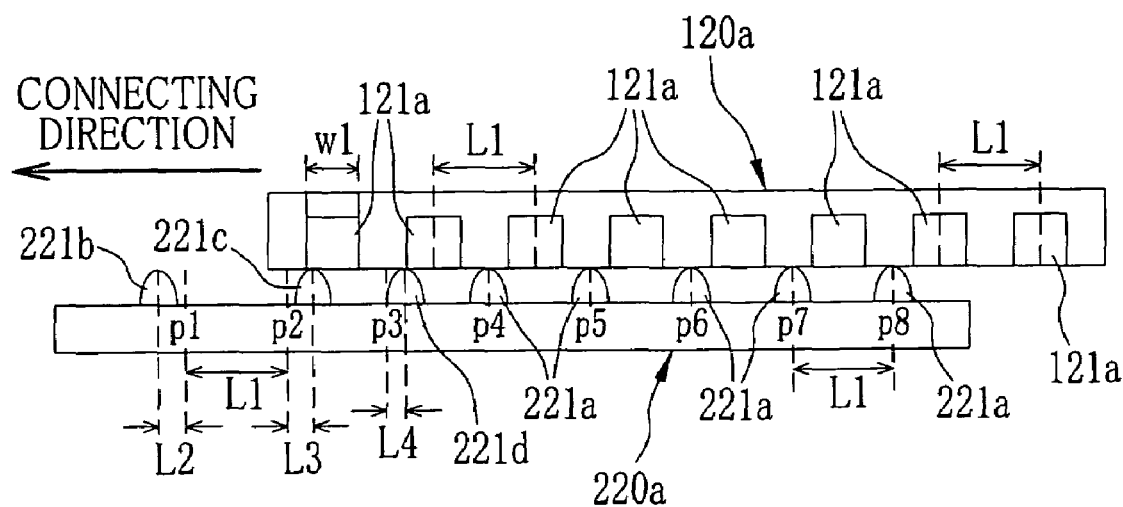
FIG. 11 is a schematic section view of terminal arrangement of a third embodiment

Next, a third embodiment of the present invention is described below with reference to FIG. 11 showing a terminal structure of this embodiment. FIG. 11 is a schematic section view taken in the sliding direction of the terminals of the bayonet claw 120a and the bayonet-claw receiver 220a confronting each other. The third embodiment includes the terminal 221d instead of the terminal 221a of the second embodiment, which is disposed at the point P3 of the bayonet-claw receiver 220a. The terminal 221d is disposed at a position separated from the point P3 by a length L4 (L4<L3) in the releasing direction. Except the terminal 221d, conditions of the terminal width, the terminal interval and so forth are identical with the second embodiment. In this third embodiment, a relationship of "L4<L3<W1/2" is satisfied.

When the operation for connecting the bayonet claw 120a and the bayonet-claw receiver 220a is performed, the terminals 221c, 221d, 221a and 221b are connected in this order. When the operation for releasing the bayonet claw 120a and the bayonet-claw receiver 220a is performed, the terminals 221b, 221a, 221d and 221c are disconnected in this order.

In virtue of the terminal 221d, it is possible to make timing of connection and release of the terminals differ in four steps. There are the following effects in addition to the effect identical with the second embodiment.

For example, in a case that the terminal 221c is used as the GND terminal and the terminal 221d is used as the electric-supply terminal, the GND terminal is connected first in attaching the lens unit 101 to the camera body 201 so that failure to be caused by static electricity is avoided. In addition, when the operation for detaching the lens unit 101 from the camera body 201 is performed, the electric-supply terminal is disconnected after disconnecting all the terminals except for the GND terminal and the electric-supply terminal so that electric connection is stabilized.

Also in the third embodiment, relative arrangement of the respective terminals 221a, 221b, 221c and 221d is not limited to FIG. 11.

In the foregoing embodiments described with reference to FIGS. 8 to 11, the connection/release timing is set to two steps, three steps and four steps by changing the intervals of the terminals. The present invention, however, is not limited to the foregoing embodiments as already mentioned in the above. Essentials of the present invention are as follows. The terminals 121a having the terminal width W1 are disposed on the bayonet claw 120a. When the bayonet claw 120a is connected to the bayonet-claw receiver 220a, the specific terminal of the bayonet-claw receiver is disposed at a position separated from a point of the bayonet-claw receiver 220a, with which the center of the terminal 121a overlaps, in the connecting direction or the releasing direction for the purpose of shifting the connection/release timing. When the operation for attaching the lens unit 101 to the camera body 201 is performed, the specific terminal is connected later as the separation length becomes longer in the connecting direction, and the specific terminal is connected earlier as the separation length becomes longer in the releasing direction. In contrast, at the time of the releasing operation, the specific terminal is disconnected earlier as the separation length becomes longer in the connecting direction, and the specific terminal is disconnected later as the separation length becomes longer in the releasing direction. By the way, as a matter of course, there is a limited range to be set with respect to the terminal width and the length separated from the reference point.

Figure 12A:
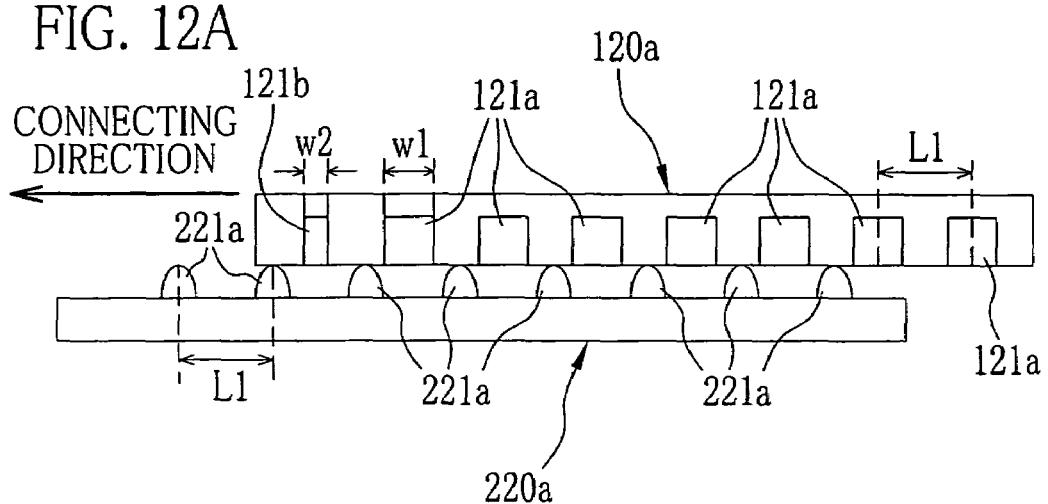
FIGS. 12A, 12B and 12C are schematic section views of terminal arrangement of a fourth embodiment.
Figure 12B:
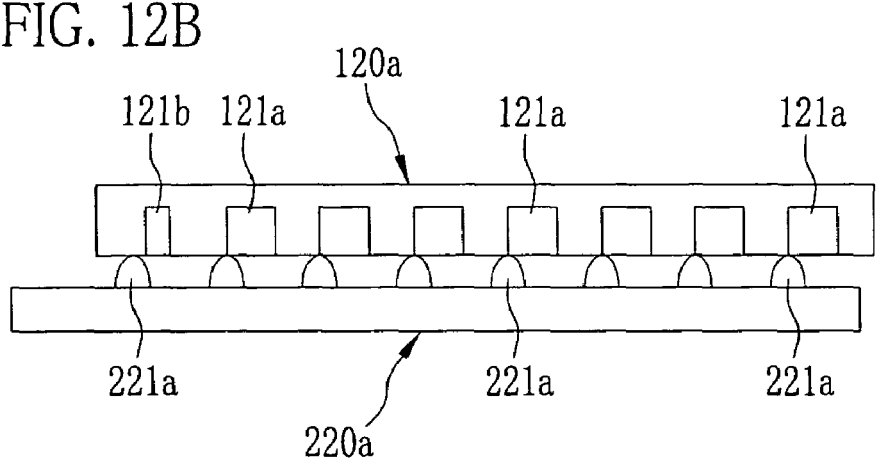
Figure 12C:
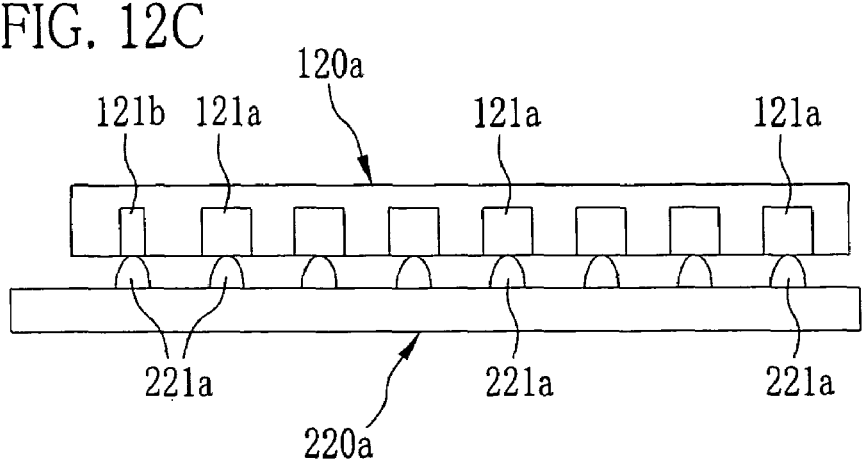

Next, a terminal structure of a fourth embodiment according to the present invention is described below. FIGS. 12A to 12C show the terminal structure of the fourth embodiment and are schematic section views taken in the sliding direction of the terminals of the bayonet claw 120a and the bayonet-claw receiver 220a confronting each other.

The terminals 121a having the terminal width W1 are disposed on the bayonet claw 120a by seven. In addition, a terminal 121b having a terminal width W2 (W2<W1) is disposed on the bayonet claw 120a. The terminals 121a and the terminal 121b are disposed at regular intervals L1. Moreover, the terminals 221a are disposed on the bayonet-claw receiver 220a at regular intervals L1 so as to confront the terminals 121a and 121b. In this fourth embodiment, a relationship of "W2<W1<L1" is satisfied.

FIG. 12A shows the beginning of slide movement wherein the bayonet claw 120a is just about to connect to the bayonet-claw receiver 220a.

In FIG. 12B, the bayonet claw 120a is slid in the connecting direction from the position shown in FIG. 12A and the terminals 121a are connected to the opposing terminals 221a. At this time, the terminal 121b is not yet connected.

In FIG. 12C, the bayonet claw 120a is further slid in the connecting direction from the position shown in FIG. 12B and the terminal 121b is connected to the opposing terminal 221a. In other words, all the terminals are connected in FIG. 12C.

By contrast, in releasing the connection of the bayonet claw 120a and the bayonet-claw receiver 220a, the bayonet claw 120a is slid relative to the bayonet-claw receiver 220a in order of FIG. 12C, FIG. 12B and FIG. 12A. Thus, the terminal 121b is disconnected while the terminals 121a are connected.

Similarly to the first embodiment, it is possible to obtain the following effects by making the terminal widths different such as described above.

When the connection of the terminal 121b is detected, it is possible to judge that all the terminals are connected. In virtue of this, it is unnecessary to provide a special mechanism for detecting the completion of the connection of the terminals. By merely changing the terminal width such as described above, it is possible to add the judgment function for judging the completion of the connection of all the terminals. This is very advantageous to reduction of a number of parts, reduction of cost, downsizing of the device, and so forth.

Meanwhile, by detecting the disconnection of the terminal 121b, it is judged that the operation for detaching the lens unit 101 from the camera body 201 is performed. From the detection of the disconnection of the terminal 121b until the disconnection of the other terminals, it is possible to turn off the power supply of the lens unit after setting the other terminals to high impedance. In virtue of this, even if the operation for detaching the lens unit 101 from the camera body 201 is performed while the image information and so forth are recoded by using the terminal 121a, it is possible to detect the disconnection of the terminal 121b on ahead so that the recording is safely stopped in the above-mentioned way while the terminal 121a is connected to the terminal 221a.

Figure 13:
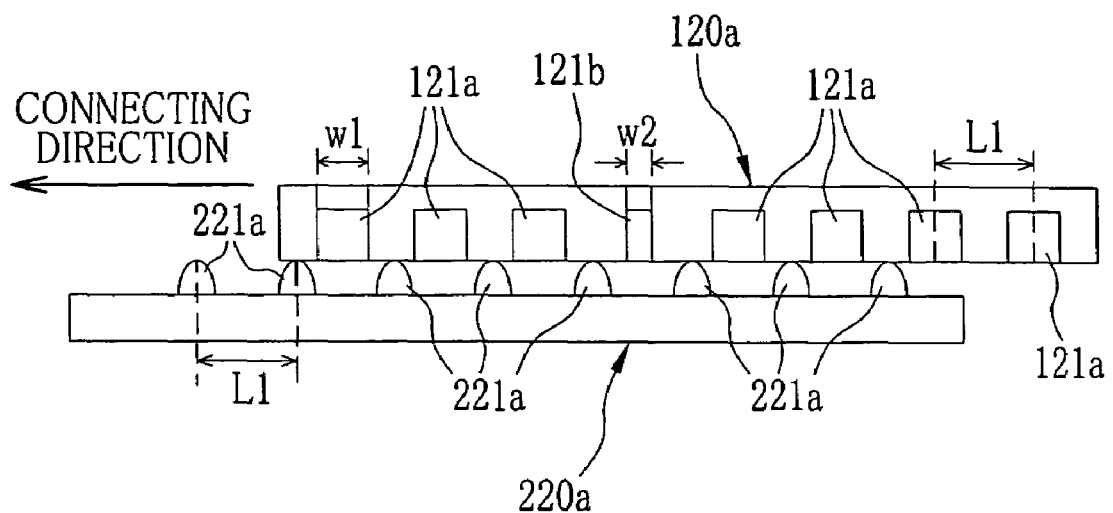
FIG. 13 is a schematic section view of terminal arrangement of the modified fourth embodiment.

Next, a modified embodiment of the fourth embodiment is described below with reference to FIG. 13. In this drawing, the terminal 121b is disposed between the terminals 121a. Except the terminal 121b, conditions of the terminal width, the terminal interval and so forth are identical with the fourth embodiment.

Also in this modified embodiment, as the bayonet claw 120a is slid in the connecting direction, the terminals 121a are connected first similarly to the fourth embodiment. After that, the terminal 121b is connected. In releasing the connection of the bayonet claw 120a and the bayonet-claw receiver 220a, the terminal 121b is disconnected while the terminals 121a are connected, similarly to the fourth embodiment.

As described above, when the width of the terminal 121b is W2 (W2<W1), effects identical with the first embodiment are obtained regardless of the arrangement order of the terminals 121a and 121b.

Next, a fifth embodiment of the present invention is described below with reference to FIGS. 14A to 14D showing a terminal structure of this embodiment. FIGS. 14A to 14D are schematic section views taken in the sliding direction of the terminals of the bayonet claw 120a and the bayonet-claw receiver 220a confronting each other.

The terminals 121a having the terminal width W1 are disposed on the bayonet claw 120a by six. In addition, the terminal 121b having the terminal width W2 (W2<W1) and a terminal 121c having a terminal width W3 (W3>W1) are disposed on the bayonet claw 120a. The terminals 121a, 121b and 121c are disposed at regular intervals L1. Moreover, the terminals 221a are disposed on the bayonet-claw receiver 220a at regular intervals L1 so as to confront the terminals 121a, 121b and 121c.

Figure 14A:
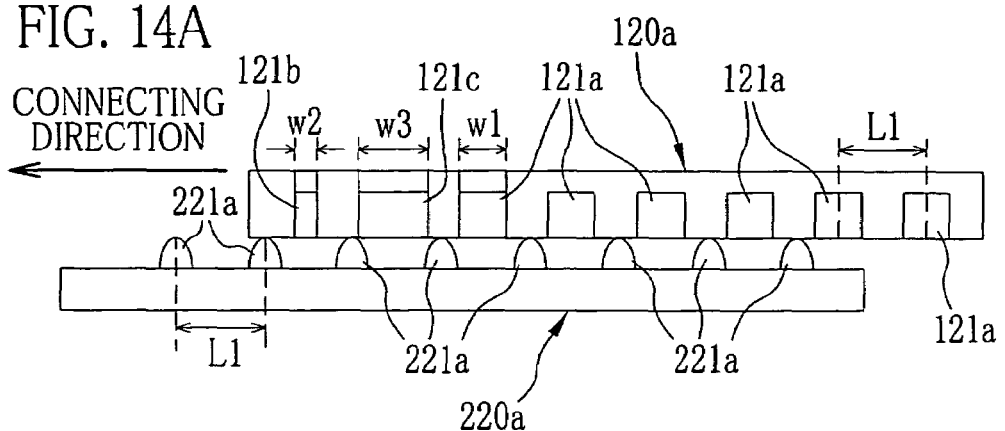
FIGS. 14A, 14B, 14C and 14D are schematic section views of terminal arrangement of a fifth embodiment.

FIG. 14A shows the beginning of slide movement wherein the bayonet claw 120a is just about to connect to the bayonet-claw receiver 220a.

Figure 14B:
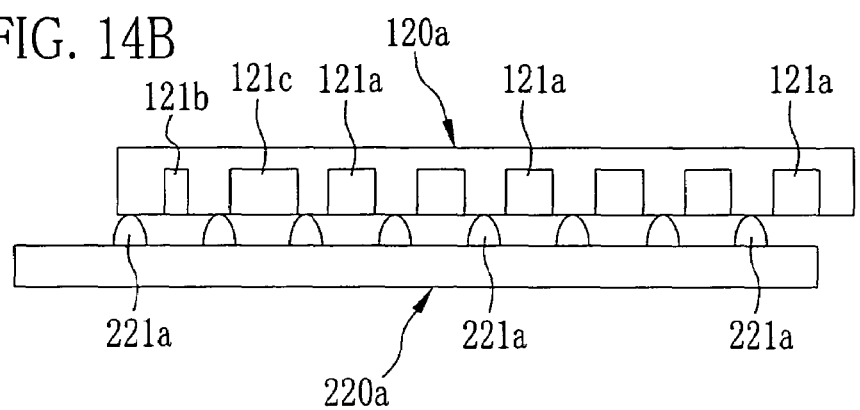

In FIG. 14B, the bayonet claw 120a is slid in the connecting direction from the position shown in FIG. 14A and the terminal 121c is connected to the opposing terminal 221a. At this time, the terminals 121a and 121b are not yet connected.

Figure 14C:
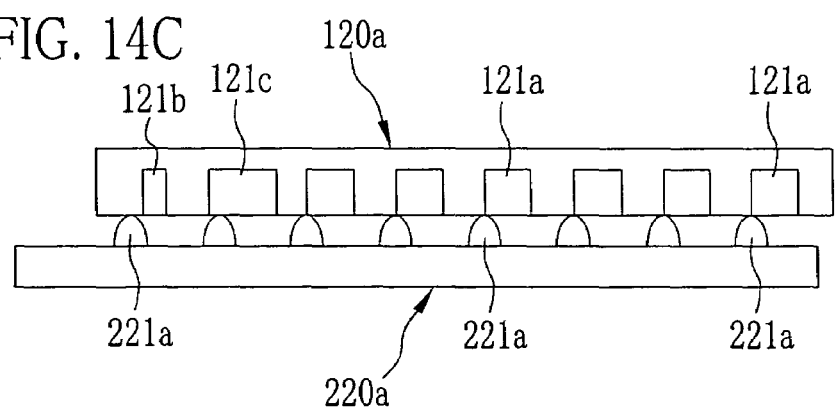

In FIG. 14C, the bayonet claw 120a is further slid in the connecting direction from the position shown in FIG. 14B and the terminals 121a are connected to the opposing terminals 221a. At this time, the terminal 121b is not yet connected.

Figure 14D:
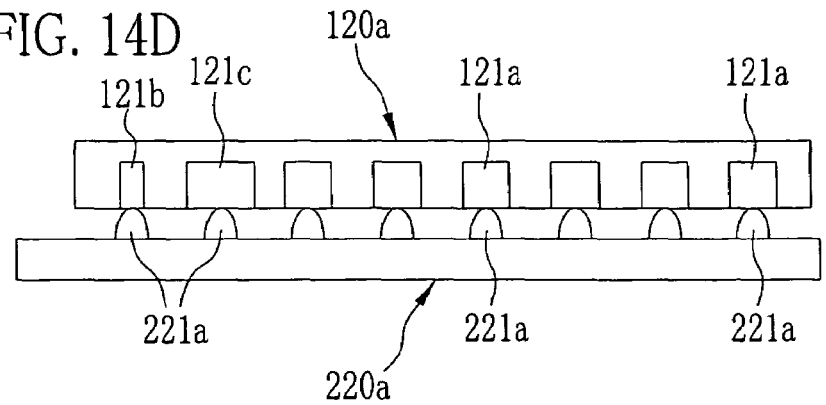

In FIG. 14D, the bayonet claw 120a is further slid in the connecting direction from the position shown in FIG. 14C and the terminal 121b is connected to the opposing terminal 221a. In other words, all the terminals are connected in FIG. 14D.

Meanwhile, in releasing the connection of the bayonet claw 120a and the bayonet-claw receiver 220a, the bayonet claw 120a is slid relative to the bayonet-claw receiver 220a in order of FIG. 14D, FIG. 14C, FIG. 14B and FIG. 14A. Thus, the terminal 121b, the terminals 121a and the terminal 121c are disconnected in this order.

In virtue of the terminal 121c, it is possible to make timing of connection and release of the terminals differ in three steps. Effects of this embodiment are identical with those of the second embodiment.

Also in the fifth embodiment, relative arrangement of the respective terminals 121a, 121b and 121c is not limited to FIGS. 14A to 14D, similarly to the foregoing modified embodiment. When the width of the terminal 121b is W2 (W2<W1) and the width of the terminal 121c is W3 (W3>W1), it is possible to obtain the effects identical with the fifth embodiment.

Figure 15:
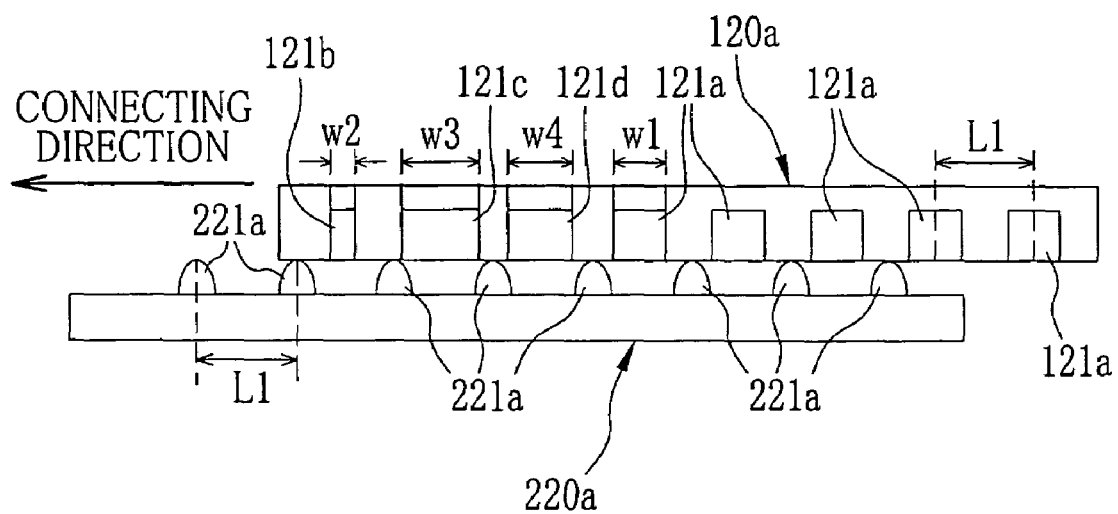
FIG. 15 is a schematic section view of terminal arrangement of a sixth embodiment.

Next, a sixth embodiment of the present invention is described below with reference to FIG. 15 showing a terminal structure of this embodiment. FIG. 15 is a schematic section view taken in the sliding direction of the terminals of the bayonet claw 120a and the bayonet-claw receiver 220a confronting each other. The terminals 121a having the terminal width W1 are disposed on the bayonet claw 120a by five. In addition, the terminal 121b having the terminal width W2 (W2<W1), the terminal 121c having the terminal width W3 (W3>W1), and a terminal 121d having a terminal width W4 (W1<W4<W3) are disposed on the bayonet claw 120a. The terminals 121a, 121b, 121c and 121d are disposed at regular intervals L1. The other conditions are identical with the fifth embodiment.

When the operation for connecting the bayonet claw 120a and the bayonet-claw receiver 220a is performed, the terminals 121c, 121d, 121a and 121b are connected in this order. When the operation for releasing the connection of the bayonet claw 120a and the bayonet-claw receiver 220a is performed, the terminals 121b, 121a, 121d and 121c are disconnected in this order.

In virtue of this, it is possible to make timing of connection and release of the terminals differ in four steps. Effects of this embodiment are identical with the foregoing embodiment.

In the above embodiments described with reference to FIGS. 12 to 15, the connection timing is set to two steps, three steps and four steps by changing the terminal width. The present invention, however, is not limited to the above embodiments as already mentioned in the foregoing. Essentials of the present invention are as follows. The terminals are disposed on the bayonet claw 120a at regular intervals. At the same time, the specific terminal whose connection timing is desired to be changed is disposed so as to have the different terminal width. Incidentally, the terminals of the bayonet-claw receiver 220a, which confronts the bayonet claw 120a, have the identical terminal width. When the operation for attaching the lens unit 101 to the camera body 201 is performed, the specific terminal of the bayonet claw 120a is connected earlier as the terminal width is longer, and the specific terminal is connected later as the terminal width is shorter. In contrast, at the time of the releasing operation, the specific terminal is disconnected later as the terminal width is longer, and the specific terminal is disconnected earlier as the terminal width is shorter. By the way, as a matter of course, there is a limited range to be set with respect to the terminal width and the distance of the terminal centers.

Figure 16A:
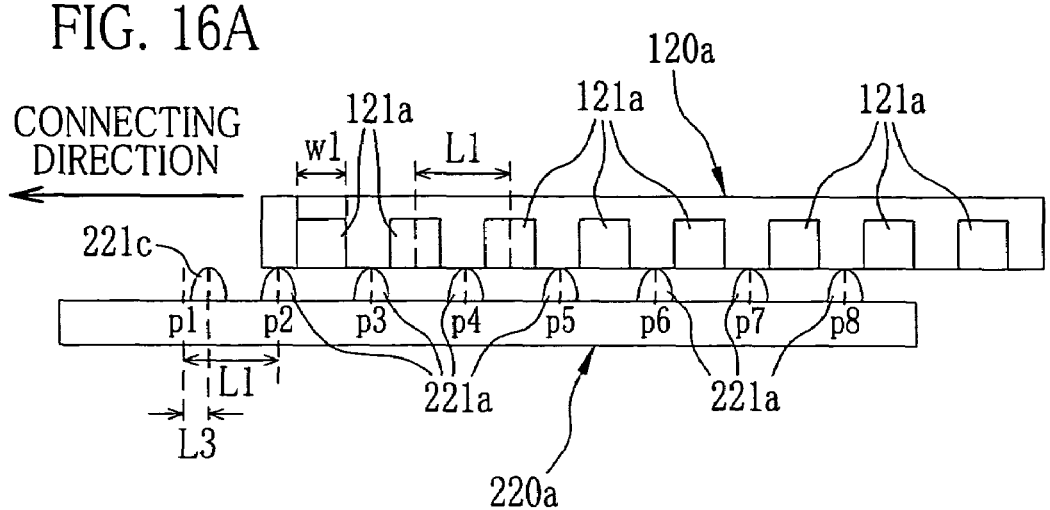
FIGS. 16A, 16B and 16C are schematic section views of terminal arrangement of a seventh embodiment.
Figure 16B:
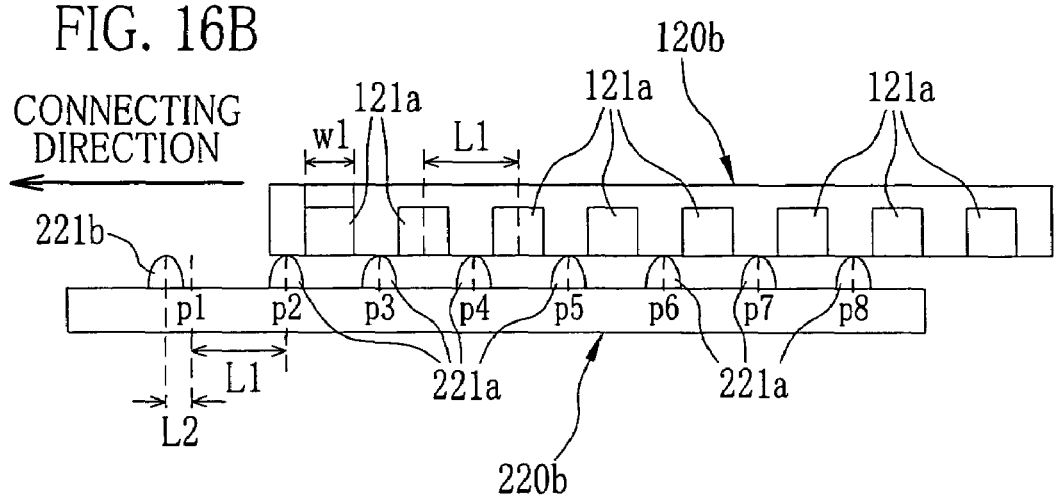
Figure 16C:
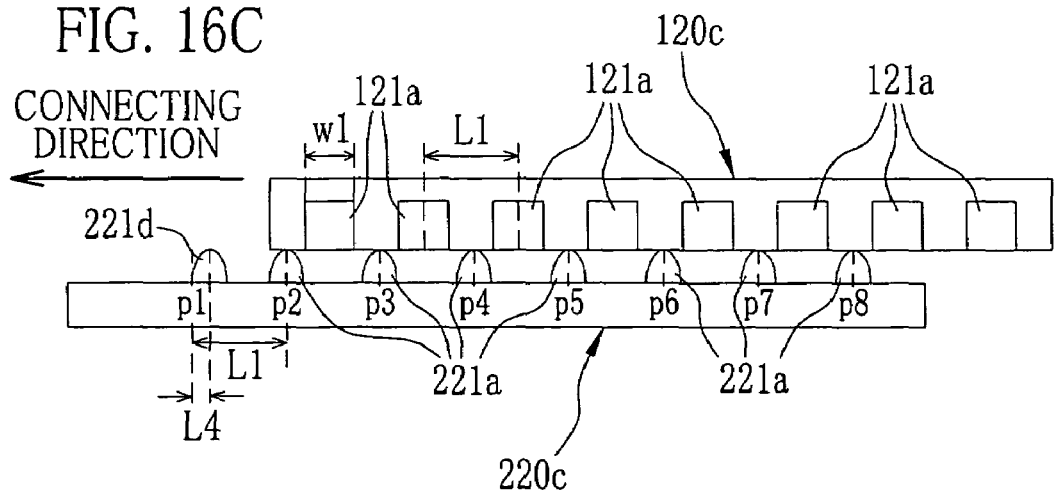

Next, a seventh embodiment of the present invention is described below with reference to FIGS. 16A to 16C showing schematic section views of the three bayonet claws 120a, 120b, 120c and the opposing bayonet-claw receivers 220a, 220b, 220c. The schematic section views shown in FIGS. 16A to 16C are taken in the slide direction of the terminals of the bayonet claws and the bayonet-claw receivers. As already described in the foregoing, since the bayonet claws 120a, 120b, 120c and the opposing bayonet-claw receivers 220a, 220b, 220c are disposed around the same circle, movement amounts thereof are identical at the time of the attaching/detaching operation of the lens unit 101 and the camera body 201. All the bayonet claws are simultaneously attached to the bayonet-claw receivers and are simultaneously detached therefrom.

In FIGS. 16A to 16C, the terminals 221b, 221c and 221d are respectively disposed on left ends of the different bayonet-claw receivers 220b, 220a and 220c. The terminals 121a having the terminal width W1 are disposed on each of the bayonet claws 120a, 120b and 120c at regular intervals L1 by eight. When the bayonet claws 120a, 120b and 120c have been connected to the bayonet-claw receivers 220a, 220b and 220c respectively, the centers of the terminals 121a overlap with the points P1 to P8 of the bayonet-claw receivers 220a, 220b and 220c. The terminal 221b is disposed at a position, which is separated from the point P1 of the bayonet-claw receiver 220b by a length L2 in the connecting direction. The terminal 221c is disposed at a position, which is separated from the point P1 of the bayonet-claw receiver 220a by a length L3 in the releasing direction. The terminal 221d is disposed at a position, which is separated from the point P1 of the bayonet-claw receiver 220c by a length L4 (L4<L3) in the releasing direction.

In this regard, the movement amounts of the bayonet claws 120a, 120b and 120c are identical at the time of the attaching/detaching operation of the lens unit 101 and the camera body 201. Thus, even when the terminals 221b, 221c and 221d are disposed on the different bayonet-claw receivers 220b, 220a and 220c such as described above, it is possible to obtain the effects identical with the third embodiment.

By disposing the terminals 221b, 221c and 221d, which have the different terminal intervals relative to the other terminals, at the end portions of the bayonet-claw receivers 220b, 220a and 220c such as described above, it is possible to form the regular-interval terminals 221a as a module. This is very advantageous to reduction of working processes and so forth.

Further, when the terminal 221d disposed at the left end of the bayonet-claw receiver is used as the electric-supply terminal similarly to the third embodiment, the electric-supply terminal is prevented from coming into contact with the other terminals at the time of connection/release of the bayonet claw 120a and the bayonet-claw receiver 220a. In the camera 100 according to the embodiment of the present invention, the electric power is supplied from the battery, which is loaded in the camera body 201, to the lens unit 101. In other words, the electric power is supplied from the electric-supply terminal of the bayonet-claw receiver 220a to the bayonet claw 120a. If the electric-supply terminal of the supply side comes into contact with the other terminal, an electric current passes into the contacting terminal and it is likely to cause a failure of the device. This problem can be avoided by disposing the electric-supply terminal at the left end of the bayonet-claw receiver.

Figure 17A:
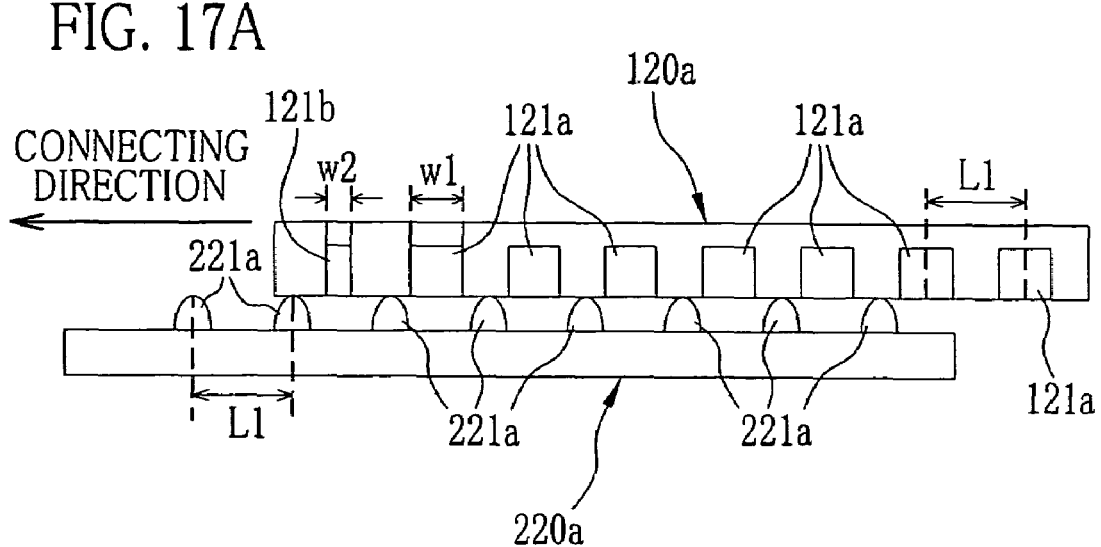
FIGS. 17A, 17B and 17C are schematic section views of terminal arrangement of an eighth embodiment.
Figure 17B:
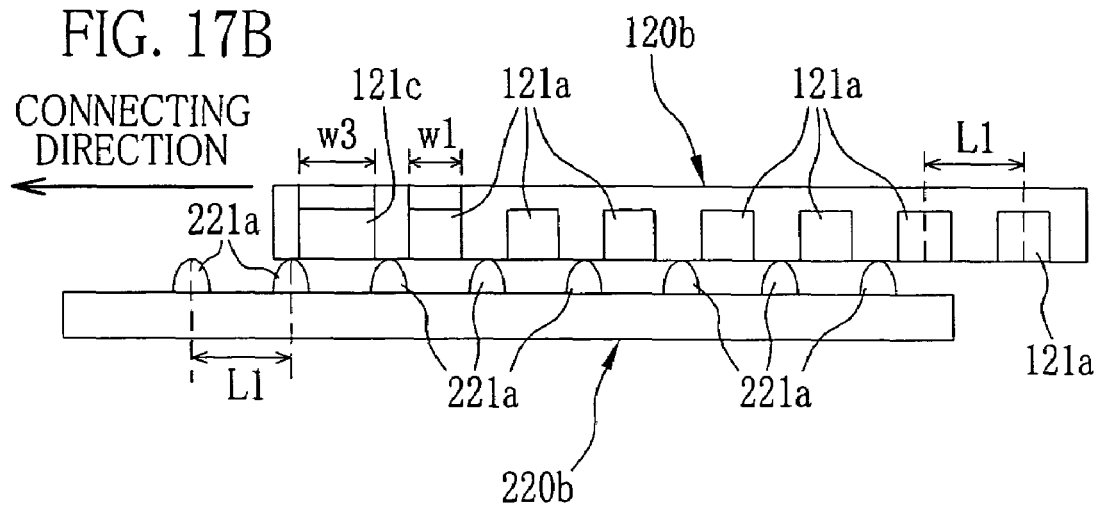
Figure 17C:
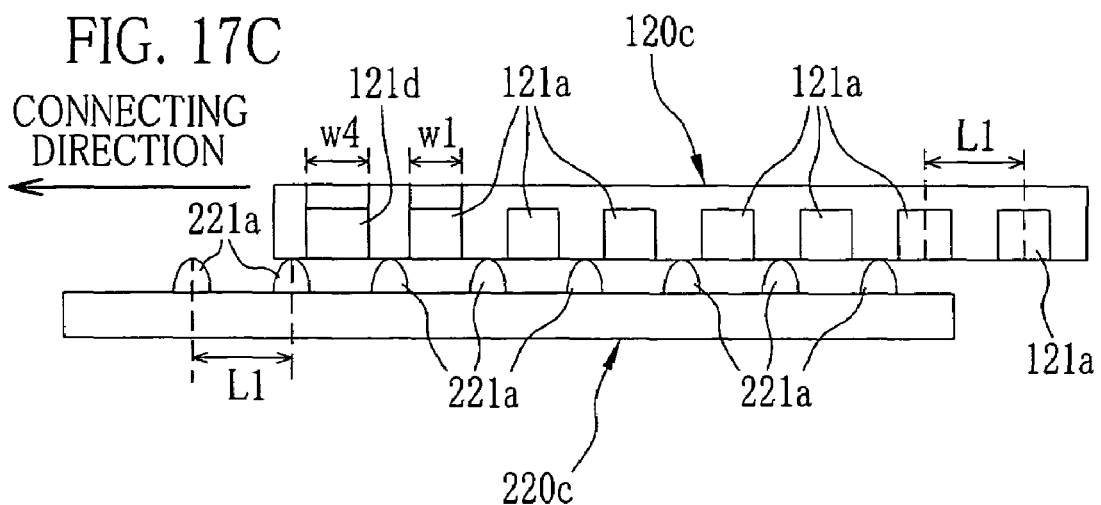

Next, an eighth embodiment of the present invention is described below with reference to FIGS. 17A to 17C. In these drawings, the terminals 121b, 121c and 121d having different widths are used instead of the terminals 221b, 221c and 221d of the seventh embodiment. In other words, the terminals 121b, 121c and 121d described in the sixth embodiment are respectively disposed at the left ends of the different bayonet claws 120a, 120b and 120c. In virtue of this, it is possible to obtain the effects identical with the seventh embodiment.

Incidentally, the seventh embodiment relates to the case in that the terminal interval is merely changed, and the eighth embodiments relates to the case in that the terminal width is merely changed. However, the terminal having the different terminal interval and the terminal having the different terminal width may be mixed. Also in this case, it is possible to obtain the identical effects.

In the foregoing first through eighth embodiments, the bayonet claws 120a, 120b, 120c and the bayonet-claw receivers 220a, 220b, 220c are distinctively described. However, the bayonet claw and the bayonet-claw receiver are distinguished for the sake of convenience and the present invention is available to a case in that the bayonet claw and the bayonet-claw receiver are interchanged.

Moreover, in the above description, the terminals whose connection/release timing is not changed are disposed at regular intervals. However, the arrangement of the regular intervals is merely described for the sake of convenience. On condition that the relative positional relationship of the opposing terminals of the bayonet claws and the bayonet-claw receivers is not changed, it is possible to obtain the effects identical with the foregoing embodiments even if the terminals are irregularly disposed. This is apparent from the seventh and eighth embodiments wherein the terminals are classified into different groups and the identical effects are obtained.

Further, as to the terminal group 121 of the lens unit 101 and the terminal group 221 of the camera body 201, the terminal numbers of these groups may be different. For example, when the terminal group 221 has twenty four terminals, the terminal group 121 may have ten terminals. The present invention may be adopted to the terminals connected to each other.

By the way, the terminal structure of the present invention is not exclusive to the electronic camera and is available to any electronics device of a system in which attachment is performed by a rotational operation after insertion. For instance, the terminal structure of the present invention is available to a combination of a recording medium and an electronics device having a display function, a combination of a radio transceiver and an electronics device having a recording function, a combination of an automobile and a lens unit comprising an image sensor, and so forth. The terminal structure of the present invention is available to any terminal portion of electrical connection. Incidentally, the present invention may be adopted to a personal computer and a telephone instead of the camera body.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An electronics device system including a first electronics device and a second electronics device to which said first electronics device is attached by a rotational operation, said electronics device system comprising:
   a first terminal group disposed on said first electronics device, said first terminal group including terminals arranged in one direction; and
   a second terminal group disposed on said second electronics device and including terminals arranged so as to correspond to the terminals of said first terminal group, said first terminal group sliding on said second terminal group from one end thereof in the direction of arrangement of said terminals when an attachment operation for attaching the first electronics device to said second electronics device is performed, and the terminals of said first terminal group being connected to the terminals of said second terminal group one on one to form a plurality of terminal pairs when said first and second electronics devices are kept in an attachment completion state,
   wherein said terminal pairs include first and second terminal pairs, said second terminal pair being connected later than said first terminal pair when said attachment operation of said first and second electronics devices is performed, and said second terminal pair being disconnected earlier than said first terminal pair when a detachment operation for detaching said first electronics device from said second electronics device is performed, and
   wherein said first terminal pair is set to high impedance after said second terminal pair has been disconnected and while said first terminal pair is connected.

2. The electronics device system according to claim 1, wherein said first electronics device and said second electronics device are coupled by bayonet connection.

3. The electronics device system according to claim 2, wherein said first electronics device includes a taking lens and an image sensor, and said second electronics device includes an image-data recorder for storing image data, which is transferred from said lens, and a display for showing an image, which is reproduced from the image data.

4. The electronics device system according to claim 3, wherein said first electronics device is a lens unit and said second electronics device is a camera body.

5. The electronics device system according to claim 1, wherein a first terminal interval is different from a second terminal interval, said first terminal interval being an interval of two terminals included in said first terminal group and forming said first and second terminal pairs, and said second terminal interval being an interval of two terminals included in said second terminal group and forming said first and second terminal pairs.

6. The electronics device system according to claim 1, wherein the terminal forming said second terminal pair has a different width from the other terminals in either one of said first and second terminal groups.

7. The electronics device system according to claim 1, wherein said second terminal pair is disposed at an outermost portion of said first and second terminal groups.

8. The electronics device system according to claim 1, wherein said terminal pairs further include a third terminal pair, which is connected earlier than said first and second terminal pairs in attaching said first electronics device to said second electronics device, said third terminal pair being disconnected later than said first and second terminal pairs in detaching said first electronics device from said second electronics device.

9. The electronics device system according to claim 8, wherein a first terminal interval is different from a second terminal interval, said first terminal interval being an interval of two terminals included in said first terminal group and forming said first and third terminal pairs, and said second terminal interval being an interval of two terminals included in said second terminal group and forming said first and third terminal pairs.

10. The electronics device system according to claim 8, wherein the terminal forming said third terminal pair has a different width from the other terminals in either one of said first and second terminal groups.

11. The electronics device system according to claim 8, wherein said first and second terminal groups are composed of plural sub-groups, and said second and third terminal pairs are respectively disposed at outermost portions of the different sub-groups.

12. The electronics device system according to claim 8, wherein said third terminal pair is either one of a ground terminal pair and an electric-supply terminal pair.

13. An electronics device to which an accessory is attached by a rotational operation, said accessory comprising a first terminal group in which terminals are arranged in one direction, said electronics device comprising:
   a second terminal group including terminals, which are arranged so as to correspond to the terminals of said first terminal group, said first terminal group sliding on said second terminal group from one end thereof in the direction of arrangement of said terminals when an attachment operation for attaching said accessory to said electronics device is performed, and the terminals of said first terminal group being connected to the terminals of said second terminal group one on one when said accessory and said electronics device are kept in an attachment completion state,
   wherein said second terminal group includes first and second terminals, said second terminal being connected later than said first terminal when said attachment operation of said accessory and said electronics device is performed, and said second terminal being disconnected earlier than said first terminal when a detachment operation for detaching said accessory from said electronics device is performed, and wherein said first terminal is set to high impedance after said second terminal has been disconnected and while said first terminal is connected.

14. The electronics device according to claim 13, wherein said second terminal is formed by changing an arrangement pitch of at least one of the terminals included in said second terminal group.

15. The electronics device according to claim 13, wherein said second terminal is formed by changing a width of at least one of the terminals included in said second terminal group.

16. The electronics device according to claim 13, wherein said second terminal is disposed at an outermost portion of said second terminal group.

17. The electronics device according to claim 13, wherein said second terminal group further includes a third terminal, which is connected earlier than said first and second terminals in attaching said accessory to said electronics device, said third terminal being disconnected later than said first and second terminals in detaching said accessory from said electronics device.

18. The electronics device according to claim 17, wherein said third terminal is formed by changing an arrangement pitch of at least one of the terminals included in said second terminal group.

19. The electronics device according to claim 17, wherein said third terminal is formed by changing a width of at least one of the terminals included in said second terminal group.

20. The electronics device according to claim 17, wherein said second terminal group is composed of plural sub-groups, and said second and third terminals are respectively disposed at outermost portions of the different sub-groups.

21. The electronics device according to claim 17, wherein said third terminal is either one of a ground terminal and an electric-supply terminal.

22. The electronics device according to claim 13, wherein said electronics device is a lens unit, which comprises a taking lens and an image sensor to produce image information.

23. The electronics device according to claim 13, wherein said electronics device is a recoding display device comprising a recorder for recording information, which is received from said accessory, and a display unit for showing said information.

* * * * *